United States Patent
Roddy

(10) Patent No.: US 11,305,513 B2
(45) Date of Patent: Apr. 19, 2022

(54) LAMINATE LINER

(71) Applicant: PHOENIX CLOSURES, INC., Naperville, IL (US)

(72) Inventor: Jeffrey John Roddy, Oswego, IL (US)

(73) Assignee: PHOENIX CLOSURES, INC., Naperville, IL (US)

( * ) Notice: Subject to any disclaimer, the term of this patent is extended or adjusted under 35 U.S.C. 154(b) by 239 days.

(21) Appl. No.: 16/384,568

(22) Filed: Apr. 15, 2019

(65) Prior Publication Data

US 2020/0324516 A1    Oct. 15, 2020

(51) Int. Cl.
*B32B 15/08*  (2006.01)
*B32B 7/12*  (2006.01)
*B32B 15/12*  (2006.01)
*B65D 41/04*  (2006.01)
*B65D 53/04*  (2006.01)
*B65D 65/40*  (2006.01)
*B32B 27/10*  (2006.01)

(52) U.S. Cl.
CPC .............. *B32B 15/08* (2013.01); *B32B 7/12* (2013.01); *B32B 15/12* (2013.01); *B32B 27/10* (2013.01); *B65D 41/045* (2013.01); *B65D 53/04* (2013.01); *B65D 65/40* (2013.01); *B32B 2435/02* (2013.01)

(58) Field of Classification Search
CPC ........... B32B 7/12; B32B 15/12; B32B 27/10; B32B 2435/02; B32B 3/08; B65D 41/045; B65D 53/04; B65D 65/40; B65D 43/02
See application file for complete search history.

(56) References Cited

U.S. PATENT DOCUMENTS

| | | | | |
|---|---|---|---|---|
| 2,005,349 A | * | 6/1935 | Raney | B65D 41/045 215/261 |
| 3,933,267 A | * | 1/1976 | Rohde | B65D 41/0435 215/350 |
| 4,457,440 A | | 7/1984 | Dukess | |

(Continued)

FOREIGN PATENT DOCUMENTS

| | | | | |
|---|---|---|---|---|
| EP | 1935636 A1 | * | 6/2008 | ............ B32B 27/08 |
| EP | 2014461 A1 | * | 1/2009 | ........... B32B 15/043 |

(Continued)

*Primary Examiner* — Travis M Figg
(74) *Attorney, Agent, or Firm* — Husch Blackwell LLP

(57) ABSTRACT

The invention relates to a laminate liner for sealingly engaging a container in an associated container and closure assembly. The liner can include at least first, second, third, and fourth layers, respectively, and have a thickness between 0.0060-0.0120 inches. The first and bottom layer, can comprise a plastic polymeric material, and have a thickness between 0.0005-0.0015 inches. The second layer can comprise a metallic material and have a thickness between 0.0005-0.0010 inches. The third layer can comprise a chip board material, and have a thickness between 0.0045-0.0055 inches. The third layer can prevent the liner from curling or deforming from its preferably flat shape. The fourth and top layer can comprise a plastic polymeric material and have a thickness between 0.0005-0.0015 inches. An adhesive bonding layer, having a thickness between 0.0003-0.0005 inches, can be located between first, second, third, and fourth layers, to bond adjacent layers together.

7 Claims, 2 Drawing Sheets

(56) References Cited

U.S. PATENT DOCUMENTS

| | | | | |
|---|---|---|---|---|
| 4,714,181 A * | 12/1987 | Kozlowski | ........... | B65D 41/045 |
| | | | | 222/480 |
| 4,778,698 A * | 10/1988 | Ou-Yang | ................. | B65D 23/02 |
| | | | | 428/458 |
| 4,789,074 A * | 12/1988 | Han | ........................ | B65D 53/04 |
| | | | | 428/116 |
| 4,818,577 A * | 4/1989 | Ou-Yang | ................... | B32B 7/12 |
| | | | | 428/317.1 |
| 4,863,061 A | 9/1989 | Moore | | |
| 4,917,949 A * | 4/1990 | Yousif | ...................... | B32B 27/12 |
| | | | | 428/416 |
| 4,948,640 A * | 8/1990 | Gibbons | ................ | B65D 5/563 |
| | | | | 426/127 |
| 5,000,992 A | 3/1991 | Kelch | | |
| 5,712,042 A * | 1/1998 | Cain | ........................ | B32B 15/04 |
| | | | | 428/458 |
| 5,720,401 A | 2/1998 | Moore | | |
| 6,082,566 A * | 7/2000 | Yousif | ...................... | B32B 27/12 |
| | | | | 215/347 |
| 6,425,492 B1 | 6/2002 | Ekkert | | |
| 6,866,926 B1 * | 3/2005 | Smelko | ...................... | B32B 5/18 |
| | | | | 428/319.3 |
| 6,908,001 B2 | 6/2005 | Moore | | |
| 6,983,857 B2 | 1/2006 | Miller et al. | | |
| 7,217,454 B2 | 5/2007 | Smelko et al. | | |
| 7,661,565 B2 | 2/2010 | Jackman | | |
| 7,740,927 B2 * | 6/2010 | Yousif | .................... | B65D 53/04 |
| | | | | 428/40.1 |
| 9,834,339 B2 * | 12/2017 | Brucker | ................. | B32B 15/08 |
| 2002/0068140 A1 | 6/2002 | Finkelstein | .......... | B65D 41/045 |
| | | | | 428/36.6 |
| 2003/0168423 A1 * | 9/2003 | Williams | ............. | B65D 50/046 |
| | | | | 222/153.1 |
| 2004/0043165 A1 * | 3/2004 | Van Hulle | ............... | B32B 15/20 |
| | | | | 428/34.2 |
| 2004/0109963 A1 * | 6/2004 | Zaggia | .................... | B29C 48/10 |
| | | | | 428/500 |
| 2005/0048307 A1 * | 3/2005 | Schubert | ................. | B32B 15/08 |
| | | | | 428/626 |
| 2005/0208242 A1 * | 9/2005 | Smelko | .................. | B65D 53/04 |
| | | | | 428/35.7 |
| 2006/0124578 A1 * | 6/2006 | Yousif | .................... | B65D 53/04 |
| | | | | 220/359.3 |
| 2006/0151415 A1 * | 7/2006 | Smelko | .................... | B32B 7/05 |
| | | | | 220/359.3 |
| 2007/0007229 A1 * | 1/2007 | Yousif | .................... | B32B 27/06 |
| | | | | 220/359.3 |
| 2007/0287779 A1 * | 12/2007 | Kimura | ................. | C08F 297/02 |
| | | | | 524/570 |
| 2008/0121605 A1 * | 5/2008 | Thorstensen-Woll | ...................... | |
| | | | | B65D 53/04 |
| | | | | 428/332 |
| 2008/0169286 A1 * | 7/2008 | McLean | ................. | C09J 123/08 |
| | | | | 156/182 |
| 2008/0231922 A1 * | 9/2008 | Thorstensen-Woll | .... | B32B 7/12 |
| | | | | 359/2 |
| 2008/0233339 A1 * | 9/2008 | Thorstensen-Woll | ...................... | |
| | | | | B65D 51/20 |
| | | | | 428/99 |
| 2008/0233424 A1 * | 9/2008 | Thorstensen-Woll | .... | B32B 7/06 |
| | | | | 428/621 |
| 2009/0304964 A1 * | 12/2009 | Sachs | ..................... | B65D 51/20 |
| | | | | 428/317.1 |
| 2009/0311454 A1 * | 12/2009 | Stephens | ................. | B32B 27/16 |
| | | | | 428/41.3 |
| 2010/0009162 A1 * | 1/2010 | Rothweiler | ............ | B65D 53/04 |
| | | | | 428/317.1 |
| 2010/0047552 A1 * | 2/2010 | McLean | ................ | B32B 37/203 |
| | | | | 428/317.1 |
| 2010/0193463 A1 * | 8/2010 | O'Brien | ................ | B32B 27/065 |
| | | | | 156/60 |
| 2012/0285920 A1 * | 11/2012 | McLean | ................. | B32B 27/36 |
| | | | | 156/271 |
| 2014/0158691 A1 * | 6/2014 | Brucker | ................. | B32B 27/10 |
| | | | | 428/347 |
| 2014/0227400 A1 * | 8/2014 | Farooqui | ................ | B65D 53/04 |
| | | | | 428/137 |
| 2015/0232235 A1 * | 8/2015 | Lloyd | .................... | B65D 50/00 |
| | | | | 220/304 |
| 2017/0007051 A1 * | 1/2017 | Fisch | ................... | B65D 51/185 |

FOREIGN PATENT DOCUMENTS

| | | | | |
|---|---|---|---|---|
| EP | 2057081 A2 * | 5/2009 | ........... | B29C 66/542 |
| EP | 0257081 | 3/2013 | | |
| EP | 2057081 B1 * | 3/2013 | ........... | B29C 65/086 |

* cited by examiner

LAMINATE LINER

BACKGROUND OF THE INVENTION

The present disclosure relates to multi-layered liners, and particularly to liners used in association with container-and-closure assemblies, where the liner can be adhered or sealed to a container for products like foods, beverages, condiments, detergents, and industrial chemicals. Located between the contact points of the container and the closure, the liner can prevent leakage or contamination of the container contents, and can provide an indication of tampering with the container-and closure-assembly or with its contents.

Certain liners can be formed from multiple layers of different materials stacked atop each other, and then inserted into closures. Subsequently, a liner-containing closure can be engaged to a container, and then the liner can be connected or sealed to the container.

In known liners containing a layer made of chip board or pulp-base material, such chip board-containing layer typically has a thickness greater than 0.0070 inches. Such a layer can provide a degree of compressibility to the liner. The chip board-containing layer can also prevent the liner from curling into a conformation that can allow the liner to fall out of the closure, in the time before the closure is engaged to the container.

There is a need for a liner having a thinner chip board-containing layer than found in conventional liners, to use less materials and leave a smaller environmental footprint. There is also a need for liners that require less heat, energy, or adhesive to engage them to an associated container, and that provide a better seal to the container. There is a particular need for a multi-layered liner that contains a thinner-than-conventional chip board layer and provides a superior seal to a container-and-closure assembly, yet remains resistant to curling in humid or wet environmental conditions.

BRIEF SUMMARY OF THE INVENTION

The present disclosure relates to liners having multiple thin layers made of different materials, including a thinner-than-usual layer made of pulp-based material or chip board, the combined layers providing a liner having a reduced tendency to curl, especially in humid environmental conditions.

An embodiment of the invention relates to a liner for engaging a closure, the liner comprising: i) a first layer comprising a first polymeric material, the first layer having a first thickness greater than or equal to 0.0005 inches and less than or equal to 0.0015 inches; ii) a second layer atop the first layer, the second layer comprising a metallic material, and the second layer having a second thickness greater than or equal to 0.0005 inches and less than or equal to 0.0010 inches; iii) a third layer comprising a chip board material, the third layer having a third thickness less than or equal to 0.0055 inches; and iv) a fourth layer comprising a second polymeric material, the fourth layer having a fourth thickness greater than or equal to 0.0005 inches and less than or equal to 0.0015 inches; such that the liner is for engaging the closure.

An aspect of the invention provides a liner such that each of the first and second polymeric materials comprises a plastic material.

Another aspect provides a liner such that the third thickness is greater than or equal to 0.0045 inches.

An additional aspect provides a liner including an adhesive layer between two neighboring layers. Yet an additional aspect is a liner such that the adhesive layer has a fifth thickness greater than or equal to 0.0003 inches and less than or equal to 0.0005 inches.

A further aspect provides a liner having a sixth thickness greater than or equal to 0.0060 inches and less than or equal to 0.0110 inches.

Another embodiment of the invention relates to a liner for sealingly engaging an opening of a container, the liner comprising: i) a first layer comprising a first polymeric material, wherein the first layer has a thickness greater than or equal to 0.0005 inches and less than or equal to 0.0015 inches; ii) a second layer atop the first layer, the second layer comprising an aluminum foil, wherein the second layer has a thickness greater than or equal to 0.0005 inches and less than or equal to 0.0010 inches; iii) a third layer atop the second layer, the third layer comprising a chip board having a thickness greater than or equal to 0.0045 inches and less than 0.0055 inches; and iv) a fourth layer atop the third layer, the fourth layer comprising a third polymeric material, wherein the fourth layer has a thickness greater than or equal to 0.0005 inches and less than or equal to 0.0015 inches; such that the liner is for sealingly engaging the container.

An aspect of the invention provides a liner including an adhesive layer between i) one of the first, second, third, and fourth layers; and ii) another of the first, second, third, and fourth layers.

Another aspect provides each pair of neighboring layers optionally comprising an adhesive layer between the pair of the neighboring layers.

Another aspect provides a liner such that third layer includes a thickness greater than or equal to 0.045 inches and less than or equal to 0.0055 inches. Yet another aspect provides a liner such that the third layer having a thickness greater than or equal to 0.045 inches and less than or equal to 0.0055 inches.

A further aspect provides a liner having a thickness greater than or equal to 0.0060 inches and less than or equal to 0.0095 inches. Yet a further aspect provides a liner having a thickness greater than or equal to 0.0060 inches and less than or equal to 0.0110 inches.

Another embodiment of the invention relates to a liner for providing a seal between a container and a closure, the liner comprising: i) first, second, third, and fourth layers, each layer having a thickness less than or equal to 0.0055 inches; ii) the first layer below the second layer, the first layer comprising a first plastic material; iii) the second layer below the third layer; the first layer comprising a metallic material; iv) the third layer below the fourth layer, the third layer comprising a chip board material; and v) the fourth layer comprising a second plastic material; such that the first layer is for communicating with a mouth of the container, and the fourth layer is for communicating with a top wall of the closure.

An aspect of the invention provides a liner such that each of the first and fourth layers have a thickness greater than or equal to 0.0005 inches and less than or equal to 0.0015 inches; the second layer has a thickness greater than or equal to 0.0005 inches and less than or equal to 0.0010 inches; and the third layer has a thickness greater than or equal to 0.0045 inches.

An aspect of the invention provides a liner comprising an adhesive layer between at least one of the following: the first and second layers; the second and third layers; and the third and fourth layers.

Another aspect provides a liner having an adhesive layer between at least one of the following: the first and second layers; the second and third layers; and the third and fourth layers. Yet another aspect provides a liner such that the adhesive layer has a thickness greater than or equal to 0.0003 inches and less than or equal to 0.0005 inches.

An additional aspect provides a liner having a thickness greater than or equal to 0.0060 inches and less than or equal to 0.0110 inches. Yet a further aspect provides a liner having a thickness greater than or equal to 0.0060 inches and less than or equal to 0.0095 inches.

A more detailed explanation of the invention is provided in the following description and claims and is illustrated in the accompanying drawings.

DETAILED DESCRIPTION OF THE PREFERRED EMBODIMENTS

Figure 1:
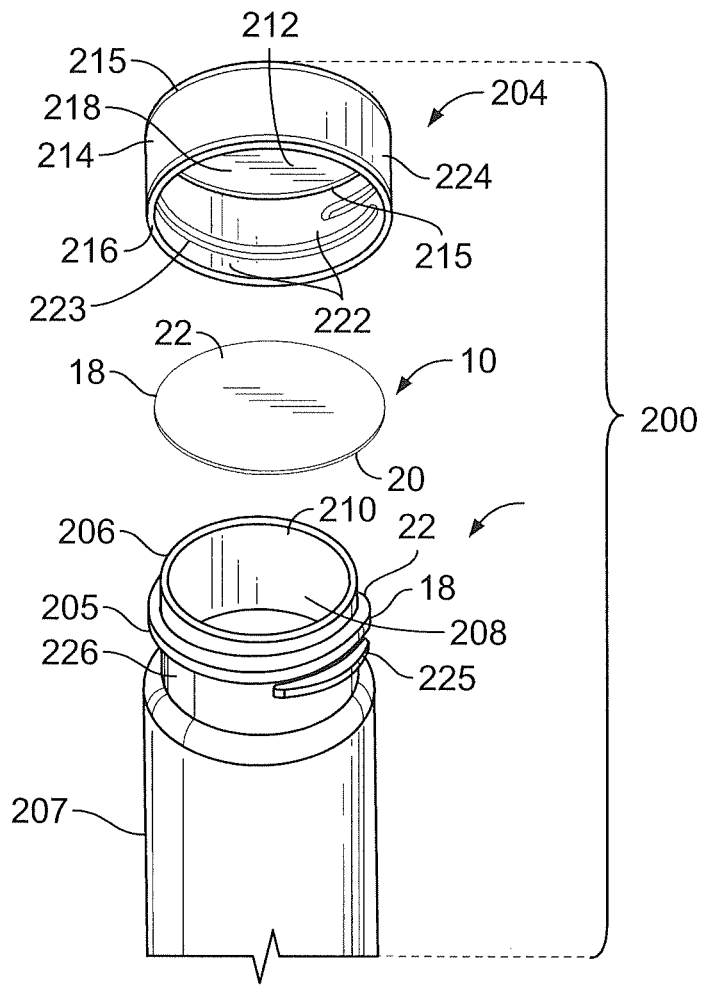
FIG. 1 is an exploded perspective view of a laminate liner with a container and a closure.

While the present invention is susceptible of embodiment in various forms, there is shown in the drawings and will hereinafter be described a specific embodiment with the understanding that the present disclosure is to be considered an exemplification of the invention and is not intended to limit the invention to the specific embodiment illustrated.

The Container Closure Assembly

FIG. 1 shows a liner 10 in use with a container closure assembly 200. The container closure assembly 200 can include a container 202 and a cap or closure 204. The container 202 can include a body 207 defining a storage reservoir 208 for holding articles. The container 202 can form a neck 205 with a lip 206 defining the outer edge of the neck 205, with the lip 206 defining a mouth 210 or opening. The mouth 210 can enable communication with the inside of the container 202. The mouth 210 is preferably round or oval in shape, though any desired shape can be used, so long as it facilitates the movement of an article into or out of the container 202. The container body 207 can vary in shape so long as it fully encompasses the container mouth 210 or opening to ensure containment of contents of the container 202.

The associated closure 204 can have an inverted hollow cup shape, with a top wall 212 and a sidewall 214 extending downward from the periphery 215 of the top wall 212, with the sidewall 214 terminating in a skirt 216. The top wall 212 can have an inner 218 and outer 220 surface, both surfaces being preferably flat. The sidewall 214 can have an inner 222 and outer 224 surface. The sidewall 214 can be round or oval, but can vary in shape, so long as the closure 204 can encompass and secure the container mouth 210. As shown in FIG. 1, the closure 204 can be attached to the container neck 205.

After a liner 10 is made, it can be inserted into the closure 204, with an upper or top surface 22 of the liner positioned to lie proximate to or flush against the inner surface 218 of the top wall 212. The closure 204 can include one or more protrusions extending inward from the inner surface 222 of the sidewall 214. Each protrusion can take the form of a thread or a shelf, for holding the liner 10 in a location proximate to the inner surface 218 of the top wall 212.

When the closure 204 and liner 10 are attached to the container 202, the liner 10 can be positioned between the top wall 212 of the closure 204 and the mouth 210 of the container 202. In this configuration, the liner top surface 22 can communicate with the inner surface 218 of the closure top wall 212, while the liner bottom surface 20 can communicate with the container mouth 210 and container storage reservoir 208.

The container body 207 can be made of a flexible or plastic material, such as polypropylene, polyethylene, or like material, though it can be made of any other material such as glass or similar material that can readily withstand heat. The closure 204 can be made of a material such as metal or plastic, but preferably is made of a plastic such as polypropylene or polyethylene which is compatible with the container 202.

The Laminate Liner

Figure 2:
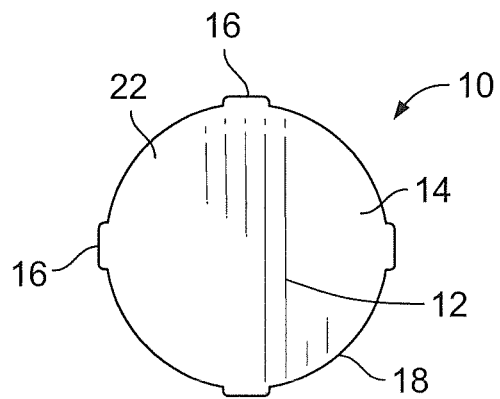
FIG. 2 is top view of a laminate liner.

As shown in FIGS. 1-2, the liner 10 can be round or oval, or any desired shape, so that the liner 10 can overlay or cover the container mouth 210. The liner 10 can have a central portion 12 surrounded by a peripheral portion 14. The liner 10 can be positioned over the container mouth 210 so that the central portion 12 can communicate with the container storage reservoir 208 and so that the peripheral portion 14 can communicate with the container mouth 210. In such position, the central portion 12 can be positioned over the container mouth 210, so that the peripheral portion 14 can be placed against, and sealed to, the container lip 206.

With respect to the closure 204, the peripheral portion 14 can engage the protrusions in the inner surface 222 of the skirt 216. Preferably, the liner 10 is of a size large enough to barely engage the protrusions. Here, if the liner 10 curls or deforms, the change in conformation can cause a part of the peripheral portion 14 to disengage from the protrusions, and result in the liner 10 falling away from the inner surface 218 of the top wall 212.

In preferred embodiments, the liner 10 can include one or more tabs 16 that can serve as grasping portions, that facilitate the removal of the liner 10 from the container 202. Such tabs 16 can be integral with the peripheral portion 14 and extend outward from the periphery 18 of the liner 10. Where there are multiple tabs 16, it is preferred that that be evenly spaced around the peripheral portion 14 of the liner 10. In the embodiment shown in FIG. 2, four equally spaced-apart tabs 16 can extend from the liner periphery 18.

When the liner 10 is inserted into the associated closure 204, the liner can be positioned to lie proximate to or flush against the inner surface 218 of the top wall 212.

The liner 10 can have a bottom surface 20 for facing away from the inner surface 218 of the top wall 212 (when the liner 10 is proximate to the closure 204). On the side opposite the bottom surface 20, the liner 10 can have a top surface 22 for facing toward the inner surface 218 of the top wall 212 (when the liner 10 is proximate to the closure 204). The bottom and top surfaces 20, 22 of the liner 10 can provide surfaces that are generally flat, planar, or level.

In preferred embodiments, the inner surface 218 of the top wall 212 provides a generally flat or planar surface that the liner 10, also preferably flat or planar in shape, can communicate with.

Figure 3:
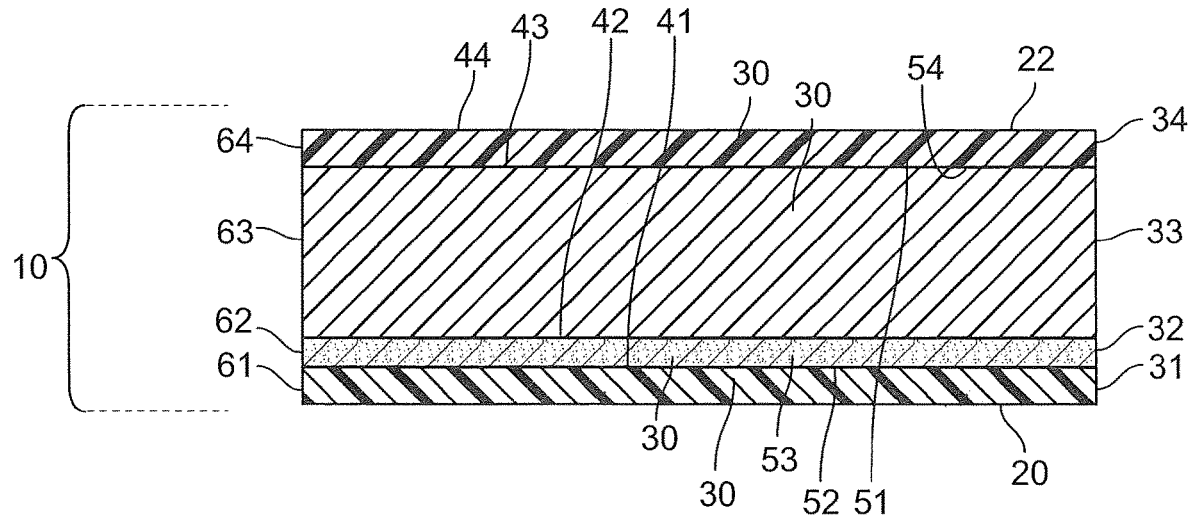
FIG. 3 is a cross-sectional view of an embodiment of the laminate liner.
Figure 4:
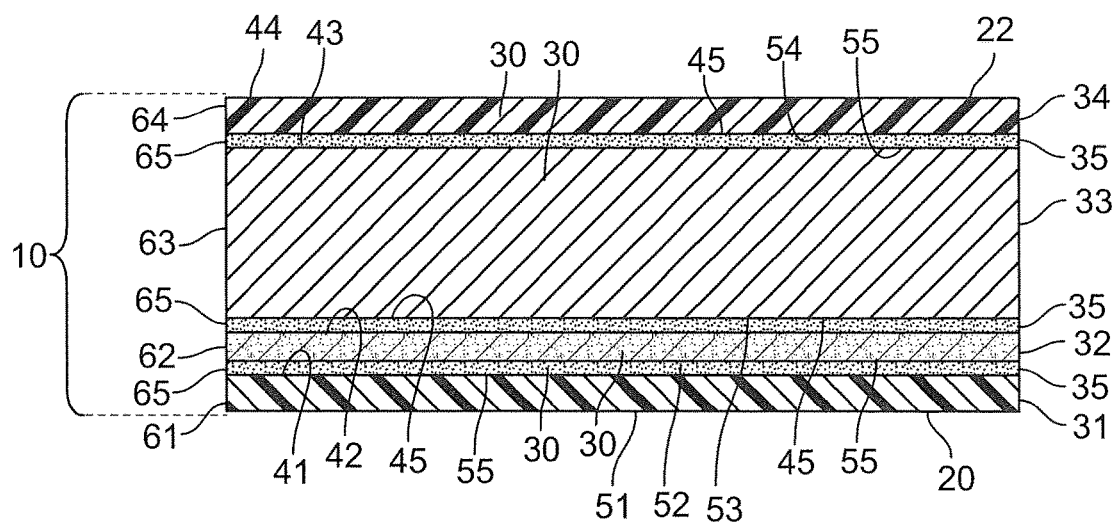
FIG. 4 is a cross-sectional view of an alternative embodiment of the laminate liner.

As particularly shown in FIGS. 3-4, the liner 10 can be formed from multiple layers of materials, pressed or fixed together to form a flat, preferably flexible, product. The liner 10 can include a plurality of layers 30 (e.g., 31, 32, 33, 34), made of a plurality of materials, such that each layer can impart one or more physical characteristics to the liner 10. For example, a metallic layer can provide gas or liquid impermeability or heat conductivity properties to the liner 10. A foam layer can provide thermal insulation. A pulp-based layer can provide strength or stability; such layer can provide a degree of compressibility, as well as a degree of stiffness to the liner 10. Different polymeric materials can provide different degrees of strength, flexibility, heat resistance, or conductivity, or confer other characteristics to the liner 10.

The individual layers 30 (or sheets or films) can be formed from a variety of materials, including polymeric materials such as resilient plastic polymers, fibrous (e.g., pulp-based or paper) materials, and the like, and mixtures thereof, as well as metallic materials such as aluminum foil.

Suitable plastic polymeric materials for the liner 10 include, but are not limited to polyethylene, high-density polyethylene, polyethylene terephthalate, polypropylene, polystyrene, polycarbonate plastics, and ethylene vinyl acetate, and mixtures thereof. Suitable plastic polymeric materials also include polymer foams made of polyolefin, polyethylene, polypropylene, polyethylene terephthalate, propylene-ethylene copolymers, and the like. Other suitable plastic materials as a component in a liner laminate can include low density polyethylene, ethylene-acrylic acid copolymers and ethylene methacrylate copolymers.

Suitable metallic materials include metals such as copper, tin, and aluminum, and alloys and the like, although an aluminum foil is preferred for a layer 30 containing a metallic material.

Suitable pulp-based materials include, but are not limited to, paper, cardboard, and chip board, and mixtures thereof. Such pulp-based layer can be made, for example, by spraying a pulp-containing solution as a sheet or film, shaving or slicing a solid piece of pulp-based material, or compressed.

Preferred embodiments of a liner 10 can include a minimum of four layers 30. From bottom to top, the liner 10 can include first, second, third, and fourth layers 31, 32, 33, 34, respectively. The first layer 31 can be located below a second layer 32, the second layer 32 can be located below a third layer 33, the third layer 33 can be located below a fourth layer 34, and so on. Each of the first, second, third, and fourth liner layers 31, 32, 33, 34 can have a thickness less than about 0.0060 inch and preferably less than about 0.0055 inches.

In some embodiments, the first, second, third, and fourth layers 31, 32, 33, 34 contact each other directly. Such liners 10 can have a thickness between about 0.0060 inches and about 0.0095 inches, with liner thickness measured as the shortest line or distance between opposite faces (e.g., 20, 22) of a liner 10.

In some embodiments, the liner 10 can include an adhesive layer 35 such as a heat activated adhesive, applied between at least one pair of adjacent liner layers (e.g., first and second layers 31, 32). Where the liner 10 includes one or more adhesive layers 35 that bond other layers 30 together, such liners 10 can have a thickness between about 0.0069 inches and about 0.0110 inches.

As shown in FIGS. 3-4, the liner 10 can include multiple layers 30 stacked from its bottom surface 20 to its top surface 22, the layers joined or pressed to each other. Like the liner 10, the individual layers 30 can have a generally flat or planar configuration.

In preferred embodiments, oriented from the bottom surface 20 and moving upward to its top surface 22, the liner 10 can include at least first, second, third, and fourth layers 31, 32, 33, 34, respectively.

Each of the first, second, third, and fourth layers 31, 32, 33, 34 can have a top surface 41, 42, 43, 44, a bottom surface 51, 52, 53, 54 on the opposing side, and a periphery 61, 62, 63, 64 defining its outer edge. Preferably, these liner layers 31, 32, 33, 34 possess a similar or same size and shape as the other liner layers 30. Additional layers 30 can be similarly configured.

The first liner layer 31 can make up the bottom surface 20 of the liner 10, while the fourth liner layer 34 can make up the top surface 22 of the liner 10, with the second and third liner layers 32, 33 providing interior layers or an interior portion 24 of the liner 10. In preferred embodiments, the first layer 31 directly contacts the second layer 32, the second layer 32 directly contacts the third layer 33, and the third layer 33 directly contacts the fourth layer 34.

Each of the first, second, third, and fourth liner layers 31, 32, 33, 34 preferably have a thickness less than 0.0060 inches and preferably less than 0.0056 inches, with a layer thickness measured as the shortest line or distance between opposite surfaces (e.g., 41, 51) of a layer (e.g. 51). Each of the first, second, third, and fourth liner layers 31, 32, 33, 34 can have a minimum thickness of about 0.0005 inches.

The layers 30 can be pressed together or manufactured together as a laminated liner 10. It is preferred that the liner 10 have a thickness less than about 0.200 inches, less than about 0.150 inches, less than about 0.110, or less than about 0.095 inches. Preferred embodiments of the liner 10 can have a thickness between 0.0060-0.0095 inches, or greater than or equal to 0.0060 inches and less than or equal to 0.0095 inches.

All of the liner layers 30 can be made of polymeric or metallic materials, but it is preferred that each particular layer 30 include a particular types of polymeric or metallic material and possess a particular thickness (or range of thickness).

The first layer 31, which can define the bottom surface 20 or layer of the liner 10, can include a plastic polymeric material. The first layer 31 can have a thickness between 0.0005-0.0015 inches, or greater than or equal to 0.0005 inches and less than or equal to 0.0015 inches.

The second layer 32, which can be located atop or above the first layer 31, can include a metallic material, such as an aluminum foil. The second layer 32 can have a thickness between 0.0005-0.0010 inches, or greater than or equal to 0.0005 inches and less than or equal to 0.0010 inches.

The third layer 33, which can be located atop or above the second layer 32, can include a material made of pulp or chip board. The third layer 33 can have a thickness between 0.0045-0.0055 inches, or greater than or equal to 0.0045 inches and less than or equal to 0.0055 inches.

A chip board layer having a thickness between about 0.0045 inches and about 0.0055 inches can provide a pulp-based layer of unconventional thinness that can: i) provide the preferred flat shape of the liner 10; ii) provide the liner 10 with sufficient rigidity or stability to resist curling or deforming or otherwise changing its shape, particularly in wet or humid environmental conditions; or iii) provide the liner with the ability to provide a strong seal between the container 202 and the closure 204. It is unexpected for a liner 10 depending on a chip board layer of less-than-conventional thinness (or thickness) described herein to maintain the liner's preferred flat, planar profile.

The fourth layer 34, which can be located atop or above the third layer 33, can define the top surface 22 or layer of the liner 10. It can comprise a plastic polymeric material. The fourth layer 34 can have a thickness between 0.0005-0.0015 inches, or greater than or equal to 0.0005 inches and less than or equal to 0.0015 inches. The first and fourth layers 31, 34 can be made of the same plastic polymeric material or different plastic polymeric materials.

When the closure 204 is engaged to the container 202, with the liner 10 positioned between them, the liner top surface 22 can communicate with the inner surface 218 of the closure top wall 212, while the liner bottom surface 20 can communicate with the container mouth 210 and container storage reservoir 208.

The bottom surface 51 of the first liner layer 31 can communicate with the container 202. The top surface 41 of the first liner layer 31 can communicate with the bottom surface 52 of the second liner layer 32. The top surface 42 of the second liner layer 32 can communicate with the bottom surface 53 of the third liner layer 33. The top surface 43 of the third liner layer 33 can communicate with the bottom surface 54 of the fourth liner layer 34. The top surface 44 of the fourth liner layer 34 can communicate with the closure 204.

Such multi-layered liners 10, having chip board layers of the disclosed thickness, can be resistant to the effects of humidity, such as curling, wrinkling, or twisting. Under humid environmental conditions (and normal, ambient conditions), such liners 10 can retain a flattened configuration for use with a closure and container assembly 200, and can also provide for a better seal between the container 202 and closure 204 than is provided by conventional liners.

To help adjacent layers 30 bond together, the liner 10 can include an adhesive bonding layer 35 applied between at least one pair of adjacent layers 30.

As shown in FIG. 4, the adhesive bonding layer 35 can have a top surface 45, a bottom surface 55 on the opposing side, and a periphery 65. The adhesive bonding layer 35 can be located between any pair of adjacent layers 30, such as the first and second layers 31, 32; the second and third layers 32, 33; or the third and fourth layers 33, 34. As shown in FIG. 4, an adhesive bonding layer 35 can be applied between each of the first, second, third, and fourth layers 31, 32, 33, 34.

An adhesive boding layer 35 can also be applied to the bottom surface 20 or top surface 22 of the liner, to facilitate adhering the liner 10 to the container 202 or the closure 204, respectively.

Preferably, the adhesive bonding layer 35 is of a similar or same size and shape as each of the liner layers 31, 32, 33, 34. Each adhesive layer 35 can have a thickness between 0.0003-0.0005 inches, or greater than or equal to 0.0003 inches and less than or equal to 0.0005 inches.

Preferred embodiments of liners 10 containing one or more adhesive bonding layers 35 can have a thickness between 0.0069-0.0110 inches, or greater than or equal to 0.0069 inches and less than or equal to 0.0110 inches. Other embodiments of such liners 10 can have a thickness between 0.0060-0.0120 inches, or greater than or equal to 0.0060 inches and less than or equal to 0.0120 inches.

The type of adhesive can be chosen to suit the characteristics of the container 202, such as a heat activated adhesive or sealant. Suitable adhesives include polyester coatings, ethylene vinyl acetate, polypropylene, ethylene-acrylic acid copolymers, surlyn, and other materials known in the industry.

It will be appreciated by those skilled in the art that numerous modifications and variations changes can be made to the embodiments described above without departing from the broad inventive concept thereof. It will be understood, therefore, that the present invention is not limited to the particular embodiments disclosed, but also covers modifications within the spirit and scope of the invention as defined by the appended claims.

What is claimed is:

1. A liner configured to engage a closure, the liner consisting of four layers and an adhesive:
   Each layer being secured to an adjacent layer by the adhesive;
   Said layers consisting of:
   a first layer comprising a first polymeric material, the first layer having a first thickness between 0.0005 inches and 0.0015 inches;
   a second layer adjacent the first layer, the second layer comprising a metallic material, and the second layer having a second thickness between 0.0005 inches and 0.0010 inches;
   and
   a fourth layer adjacent a third layer comprising a second polymeric material, the fourth layer having a fourth thickness between 0.0005 inches and between 0.0015 inches;
   wherein the improvement is the third layer adjacent the second layer consisting of a pulp based material configured to resist curling and having a thickness from 0.0045 to 0.0055 inches;
   wherein the liner is thereby configured to engage and seal the closure, without curling.

2. The liner of claim 1 wherein the first and second polymeric materials comprise a plastic material.

3. The liner of claim 1 wherein the third thickness is 0.0045 inches.

4. The liner of claim 1, the adhesive having a fifth thickness between 0.0003 inches and 0.0005 inches.

5. A liner configured to sealingly engage an opening of a container, the liner consisting of four layers and an adhesive;
   Each layer secured to an adjacent layer by the adhesive;
   said plurality of layers consisting of:
   a first layer comprising a first polymeric material, wherein the first layer has a thickness between 0.0005 inches and 0.0015 inches;
   a second layer adjacent the first layer, the second layer comprising an aluminum foil, wherein the second layer has a thickness between 0.0005 inches and 0.0010 inches;
   a third layer adjacent the second layer, the third layer consisting of a pulp-based material configured to assist in resisting deformation of the entire liner and having a thickness between 0.0045 inches and 0.0055 inches; and
   a fourth layer adjacent the third layer, the fourth layer comprising a third polymeric material, wherein the fourth layer has a thickness between 0.0005 inches and to 0.0015 inches;
   wherein the liner is configured to sealingly engage the container without deforming.

6. The liner of claim 5, the liner having a thickness between 0.0060 inches and 0.0095 inches.

7. The liner of claim 5, the liner having a thickness greater than or equal to 0.0060 inches and less than or equal to 0.0120 inches.

* * * * *